(12) United States Patent
Pierson et al.

(10) Patent No.: US 12,137,120 B2
(45) Date of Patent: *Nov. 5, 2024

(54) DECEPTION SYSTEM

(71) Applicant: BlackCloak, Inc., Lake Mary, FL (US)

(72) Inventors: Christopher Pierson, Lake Mary, FL (US); Daniel N. Floyd, Windermere, FL (US)

(73) Assignee: BlackCloak, Inc., Lake Mary, FL (US)

( * ) Notice: Subject to any disclaimer, the term of this patent is extended or adjusted under 35 U.S.C. 154(b) by 329 days.

This patent is subject to a terminal disclaimer.

(21) Appl. No.: 17/533,971

(22) Filed: Nov. 23, 2021

(65) Prior Publication Data
US 2022/0239695 A1 Jul. 28, 2022

Related U.S. Application Data

(63) Continuation of application No. 17/159,545, filed on Jan. 27, 2021, now Pat. No. 11,223,652.

(51) Int. Cl.
*H04L 9/40* (2022.01)

(52) U.S. Cl.
CPC ............... *H04L 63/1491* (2013.01)

(58) Field of Classification Search
None
See application file for complete search history.

(56) References Cited

U.S. PATENT DOCUMENTS 9,398,462 B1* 7/2016 Delker .................... H04W 4/60
10,855,722 B1* 12/2020 Vadlamani .......... H04L 63/1408
10,867,321 B1* 12/2020 MacDonald-Korth ......................
  G06Q 30/0255
11,223,652 B1 1/2022 Pierson et al.
2010/0077483 A1* 3/2010 Stolfo ................... G06F 21/554
  726/23
2012/0084866 A1 4/2012 Stolfo
2012/0210119 A1* 8/2012 Baxter ............... G06Q 30/0253
  713/150

(Continued)

FOREIGN PATENT DOCUMENTS

WO 2022164504 8/2022

OTHER PUBLICATIONS

"U.S. Appl. No. 17/159,545, Final Office Action mailed Jul. 12, 2021".

(Continued)

*Primary Examiner* — Olugbenga O Idowu
(74) *Attorney, Agent, or Firm* — Schwegman Lundberg & Woessner, P.A.

(57) ABSTRACT

Systems and methods are presented for causing deception technology to be installed on a first computing device, generating a unique identifier for a user associated with the first computing device and the first computing device, and generating a unique Uniform Resource Locator (URL) associated with the unique identifier. The systems and methods further presented for transmitting the unique URL to the first computing device, detecting that the unique URL has been accessed by a second computing device, capturing data identifying the time and date the unique URL is accessed and information associated with the second computing device accessing the URL, and generating a notification to alert the user of the first computing device of unauthorized access.

20 Claims, 7 Drawing Sheets

(56) References Cited

U.S. PATENT DOCUMENTS

| | | | | |
|---|---|---|---|---|
| 2013/0232543 A1* | 9/2013 | Cheng | H04L 63/20 | |
| | | | 726/1 | |
| 2014/0157358 A1* | 6/2014 | Agarwal | H04L 63/0227 | |
| | | | 726/1 | |
| 2015/0213238 A1* | 7/2015 | Farha | G06F 21/34 | |
| | | | 726/30 | |
| 2016/0044122 A1* | 2/2016 | Sandholm | H04W 4/06 | |
| | | | 709/206 | |
| 2017/0103674 A1 | 4/2017 | Sadeh-koniecpol et al. | | |
| 2017/0104785 A1* | 4/2017 | Stolfo | H04L 63/1491 | |
| 2017/0289191 A1* | 10/2017 | Thioux | H04L 63/1441 | |
| 2018/0198774 A1 | 7/2018 | Pitel et al. | | |
| 2021/0058395 A1* | 2/2021 | Jakobsson | H04L 67/306 | |

OTHER PUBLICATIONS

"U.S. Appl. No. 17/159,545, Non Final Office Action mailed Mar. 29, 2021".

"U.S. Appl. No. 17/159,545, Notice of Allowance mailed Oct. 29, 2021".

"U.S. Appl. No. 17/159,545, Response filed Jun. 28, 2021 to Non Final Office Action mailed Mar. 29, 2021", 10 pages.

"U.S. Appl. No. 17/159,545, Response Filed Sep. 8, 2021 to Final Office Action Mailed Jul. 12, 2021", 12 pgs.

"Autonomous Deception", https://www.acalvio.com/, (accessed on Jan. 26, 2021), 5 pgs.

"Canaryio / canary", https://github.com/canaryio/canary, (accessed on Jan. 26, 2021), 2 pgs.

"Deception Technology for Early and Accurate Threat Detection", https://attivonetworks.com/, (accessed on Jan. 26, 2021), 16 pgs.

"Illumio Named a Leader in the Forrester Zero Trust Wave", https://www.illumio.com/, (accessed on Jan. 26, 2021), 6 pgs.

"Introducing TrapX Flex", https://trapx.com/, (accessed on Jan. 26, 2021), 7 pgs.

"ShadowPlex Autonomous Deception", https://www.acalvio.com/product/, (accessed on Jan. 26, 2021), 7 pgs.

"Sting Box", https://sting-box.com/, (accessed on Jan. 26, 2021), 6 pgs.

"Stop Attackers from Accessing Critical Assets", https://illusive.com/, (accessed on Jan. 26, 2021), 5 pgs.

"Thinkst Canary", https://canary.tools/, (accessed on Jan. 26, 2021), 5 pgs.

"International Application Serial No. PCT US2021 061138, International Search Report mailed Jan. 11, 2022", 2 pgs.

"International Application Serial No. PCT US2021 061138, Written Opinion mailed Jan. 11, 2022", 8 pgs.

"International Application Serial No. PCT US2021 061138, International Preliminary Report on Patentability mailed Aug. 10, 2023", 10 pgs.

* cited by examiner

```
↺⟩⌂~⟩
⟩ nmap -sV 127.0.0.1 -p 2121
Starting Nmap 7.91 ( https://nmap.org ) at 2021-01-13 20:24 EST
Nmap scan report for localhost (127.0.0.1)
Host is up (0.00022s latency).

PORT     STATE SERVICE VERSION
2121/tcp open  ftp         ProFTPD 1.2.8
Service Info: OS: Unix Service detection performed. Please report any incorrect results at https://nmap.org/submit/ .
Nmap done: 1 IP address (1 host up) scanned in 0.33 seconds
↺⟩⌂~⟩
⟩telenet 127.0.0.1 2121
Trying 127.0.0.1...
Connected to localhost.
Escape character is '^]'.
220 ProFTPD 1.2.8 Server
Username: admin
Password: admin
Password: password
Password: test
Password: []
```

*FIG. 3*

```
 /code/local/honeypot
> node nodehoneypot.js
server listening to {"address":"127.0.0.1","family":"IPv4","port":2121}
new client connection at [2021-01-14T01:24:42.887Z]
remoteAddress: [undefined]
remotePort: [undefined]
remoteFamily: [undefined]
Connection [undefined:undefined] error: [read ECONNRESET]
connection from [undefined:undefined] closed
New client connection at [2021-01-14T01:24:42.944Z]
remoteAddress: [127.0.0.1]
remotePort: [55604]
remoteFamily: [IPv4]
connection from [127.0.0.1:55604] closed
new client connection at [2021-01-14T01:24:59.931Z]
remoteAddress: [127.0.0.1]
remotePort: [55607]
remoteFamily: [IPv4]
connection data from [127.0.0.1:55607]: [{"type":"Buffer","data":[97,100,109,105,110,13,10]}] – at [2021-01-14T01:25:03.543Z]
connection data from [127.0.0.1:55607]: [{"type":"Buffer","data":[97,100,109,105,110,13,10]}] – at [2021-01-14T01:25:05.460Z]
connection data from [127.0.0.1:55607]: [{"type":"Buffer","data":[112,97,115,115,119,111,114,100,13,10]}] – at [2021-01-14T01:25:08.839Z]
connection data from [127.0.0.1:55607]: [{"type":"Buffer","data":[116,101,115,116,13,10]}] – at [2021-01-14T01:25:16.310Z]
```

DECEPTION SYSTEM

PRIORITY

This application is a continuation of U.S. patent application Ser. No. 17/159,545, filed Jan. 27, 2021, which is incorporated by reference herein in its entirety.

BACKGROUND

Unauthorized access to a computing system or device is a big issue for both business systems and devices and personal devices. For example, a hacker can access a computing system or device to steal private or sensitive data, such as login name(s) and password(s), financial information (e.g., credit card numbers, bank account information), personal information, government data, and so forth.

Detecting unauthorized access to a computing system or device is a challenge that is difficult to solve. Anti-virus/anti-malware solutions struggle to identify every instance of malware that could impact a computer. Other existing solutions to detect unauthorized access without compromising real data include physical hardware devices that can be attached to a computing system or device to mimic a user's actual storage device or setting up an entire network of databases and machines to mimic an actual network. These solutions are not practical or scalable to a mobile device or other personal computing device scenario.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to deception technology used to detect that a computing device, such as a mobile device or desktop computer, has been accessed by an unauthorized user. In example embodiments, a server system causes installation of deception technology on a first computing device and generates a unique identifier for a user associated with the first computing device and the first computing device and a unique Uniform Resource Locator (URL) associated with the unique identifier. The server system transmits the unique URL to the first computing device. For example, the server system can transmit the unique URL to the first computing system in at least one of the following formats: as a message, as part of a new contact to be imported into the contacts on the first computing device, as a shortcut to be added to a user interface of the first computing device, as an icon to be added to a user interface of the first computing device, as a meeting invite, as a note to be added to a notes application on the first computing device, or other format.

When the server system detects that the unique URL has been accessed by a second computing device, the server system captures data associated with the access, such as data identifying the time and date the unique URL is accessed and other information associated with the second computing device accessing the URL, such as an IP address, a MAC address, system information associated with the second computing device, events associated with access of the URL, GPS location of the computing device accessing the URL, motion information, or network information. The server system can generate a notification to alert the user of the first computing device of the unauthorized access and send the generated notification to the user by one or more communication methods (e.g., email, text message, phone call). Moreover, the server system can send the notification to a central monitoring center or security operations center. In this way, the server system can detect and provide notification of unauthorized access to a user device without requiring cumbersome and expensive hardware or systems.

Figure 1:
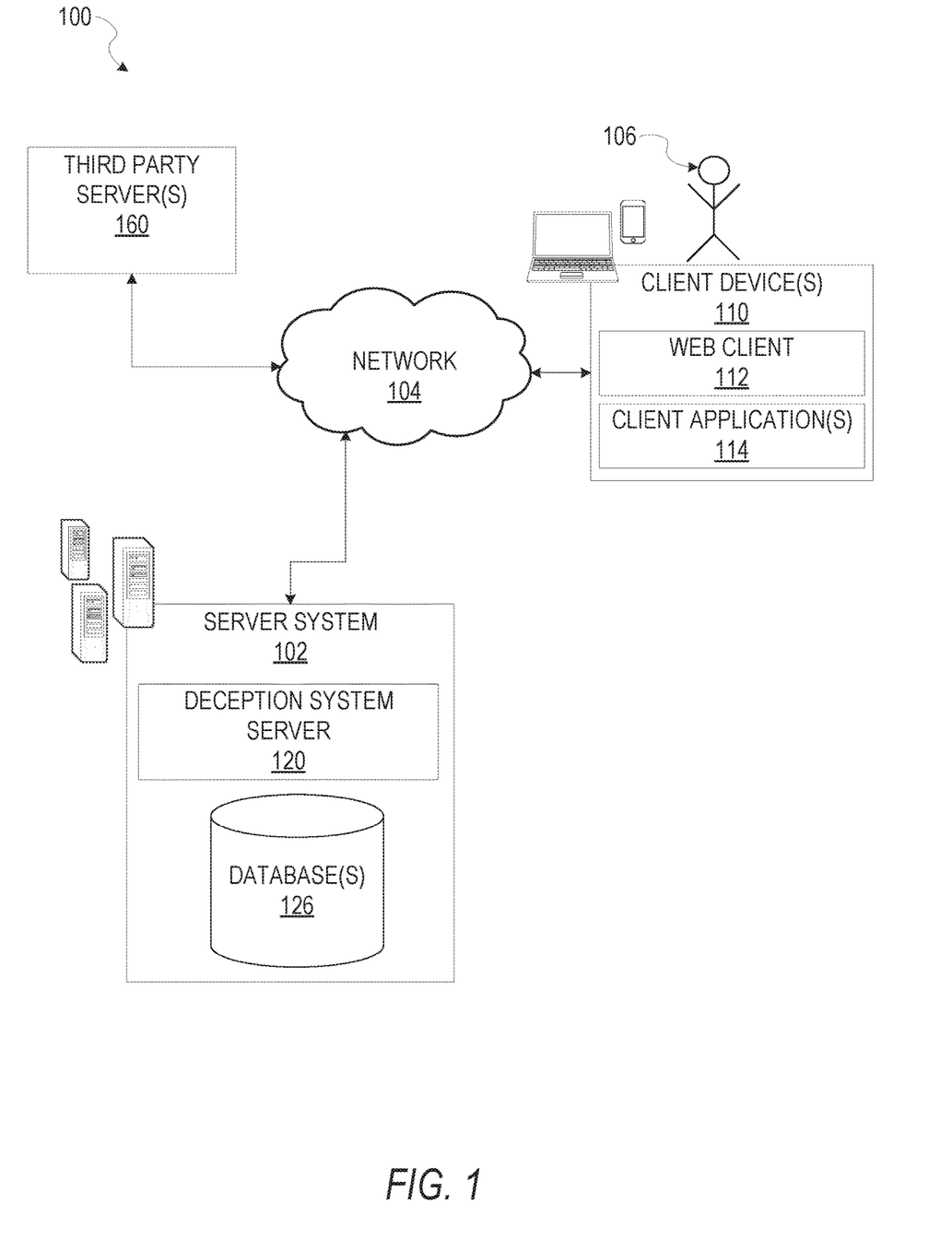
FIG. 1 is a block diagram illustrating a networked system, according to some example embodiments.

FIG. 1 is a block diagram illustrating a networked system 100, according to some example embodiments. The system 100 may include one or more client devices such as client device(s) 110. The client device(s) 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 100. In some embodiments, the one or more client device(s) 110 may comprise a display module (not shown) to display information (e.g., in the form of user interfaces). In further embodiments, the client device(s) 110 may comprise one or more of touch screens, accelerometers, gyroscopes, cameras, microphones, global positioning system (GPS) devices, and so forth.

The client device(s) 110 may be a device of a user that is used to send and receive electronic communication, such as email, instant messages, and the like. One or more users 106 may be a person, a machine, or other means of interacting with the client device(s) 110. In example embodiments, the user 106 may not be part of the system 100, but may interact with the system 100 via the client device(s) 110 or other means. For instance, the user 106 may provide input (e.g., touch screen input or alphanumeric input) to the client device(s) 110 and the input may be communicated to other entities in the system 100 (e.g., third party server(s) 160, server system 102) via the network 104. In this instance, the other entities in the system 100, in response to receiving the input from the user 106, may communicate information to the client device(s) 110 via the network 104 to be presented to the user 106. In this way, the user 106 may interact with the various entities in the system 100 using the client device(s) 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device(s) 110 may access the various data and applications provided by other entities in the system 100 via web client 112 (e.g., a browser, such as the Internet Explorer® browser developed by Microsoft® Corporation of Redmond, Washington State) or one or more client applications 114. The client device(s) 110 may include one or more client applications 114 (also referred to as "apps") such as, but not limited to, a web browser, messaging application, electronic mail (email) application, a social networking application, an e-commerce site application, a mapping or location application, deception technology application, and the like. In some embodiments, one or more client applications 114 may be included in a given client device 110, and configured to locally provide the user interface and at least some of the application functionalities. The client application(s) 114 are configured to communicate with other entities in the system 100 (e.g., analyst device(s) 130, third party server(s) 160, server system 102), on an as-needed basis, for data and/or processing capabilities not locally available (e.g., sending and receiving electronic communication, accessing electronic communication, analysis of potentially fraudulent electronic communication, to authenticate a user 106, to verify a method of payment, to receive a notification of unauthorized access). Conversely, one or more client applications 114 may not be included in the client device(s) 110, and then the client device(s) 110 may use its web browser to access the one or more client applications 114 hosted on other entities in the system 100 (e.g., third party server(s) 160, server system 102).

A server system 102 may provide server-side functionality via the network 104 (e.g., the Internet or wide area network (WAN)) to one or more third party servers 160, and/or one or more client devices 110. The server system 102 includes a deception system server 120, which is communicatively coupled with one or more databases 126. Database(s) 126 may be storage devices that store information such as user information, unique identifiers for users and user devices, unique Uniform Resource Locators (URLs) associated with the unique identifiers, information captured upon detecting unauthorized access of a computing device, notifications and communications with user devices, and so forth. In example embodiments the example of a unique URL is used. It is to be understood that any string of unique numbers and/or characters could be used, such as a phone number, IP address, or other unique string.

The deception system server 120 provides functionality to detect unauthorize access to a computing device, capture data associated with the unauthorized access, provide communications (e.g., alerts, notifications) about the unauthorized access, and other functionality described herein. The deception system server 120 may access one or more databases 126 to retrieve stored data to use for this functionality.

The system 100 includes one or more third party servers 160. The one or more third party servers 160 may interact with the server system 102 via deception system server 120.

Figure 2:
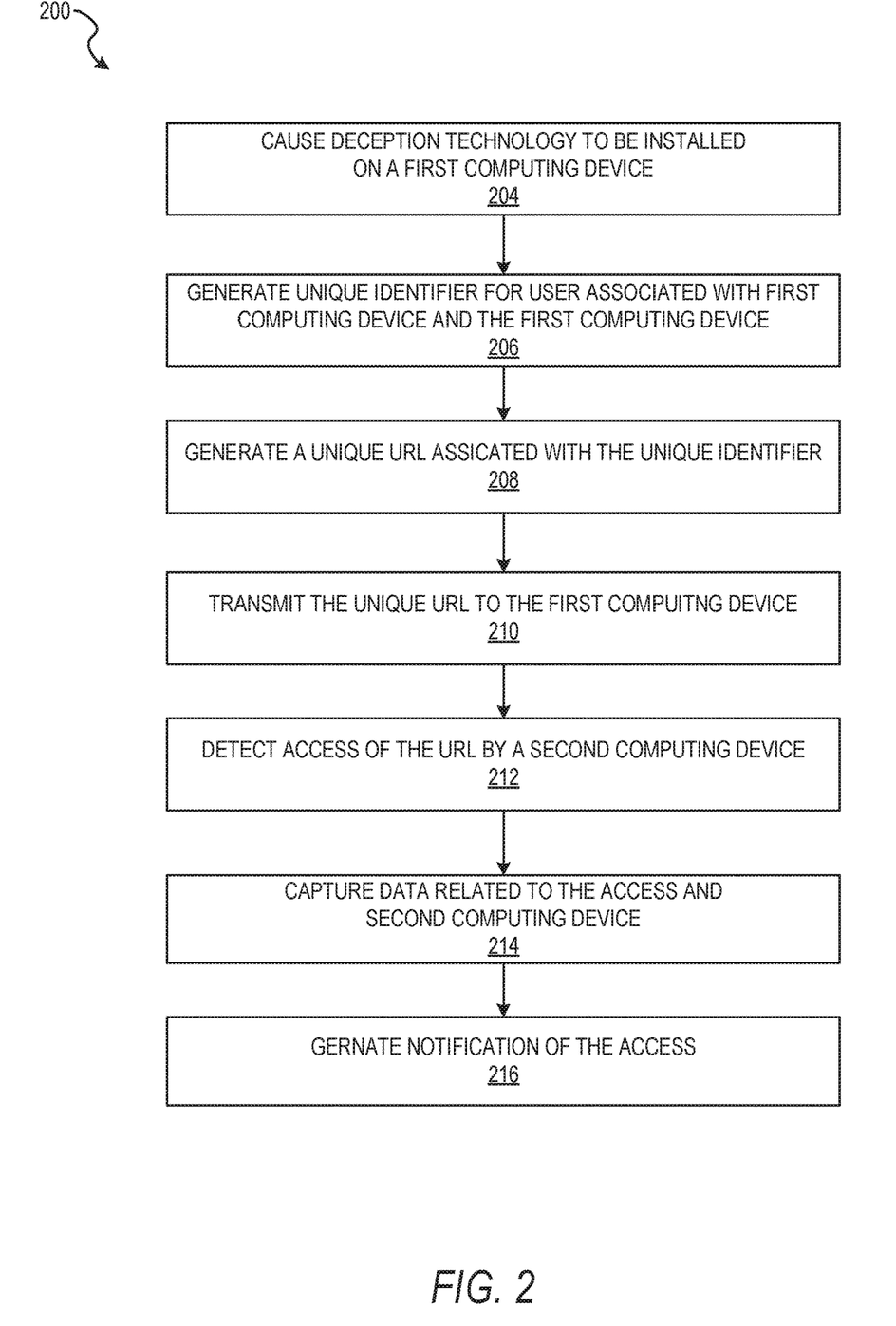
FIG. 2 is a flowchart illustrating aspects of a method, according to some example embodiments.

FIG. 2 is a flow chart illustrating aspects of a method 200, according to some example embodiments. For illustrative purposes, method 200 is described with respect to the networked system 100 of FIG. 1. It is to be understood that method 200 may be practiced with other system configurations in other embodiments.

In operation 204, a server system (e.g., server system 102, deception system server 120) causes deception technology to be installed on a first computing device. For example, a user may wish to protect her computing device (e.g., mobile phone, tablet, desktop) from unauthorized access and may install deception technology on each device she would like to protect. In one example, the user may request installation of the deception technology via a webpage, an app store (e.g., via a third-party provider), directly from the server system, or other means to request installation of the deception technology. The server system can provide the deception technology to the third-party provider to cause the deception technology to be installed on one or more devices or directly provide the deception technology to the first computing device to cause it to be installed on the first computing device. The server system can transmit the deception technology to the first computing device to cause the deception technology to be installed on the first computing device.

In one example, the deception technology is in the form of a program or application that is installed on the first computing device. For example, the deception technology program or application is installed on the first computing device to facilitate the operations described herein with respect to FIG. 2 and communications with the server system.

In operation 206, the server system generates a unique identifier for a user associated with the computing device and the computing device. For example, the server system creates a number and/or character combination that is unique to both the user and the device (e.g., 149021 or T3c89P2) to distinguish from other users and devices in the system. In another example, one unique identifier is created for a user (e.g., 12Yu00) and a second unique identifier is created for the device (e.g., 3Un00X). In one example, the unique identifier for the user and the unique identifier for the device, can be combined into one unique identifier (e.g., 12Yu003Un00X). In this way, the server system can uniquely identify the user and the associated device.

In an alternative embodiment, the unique identifier can be generated on the computing device via the deception technology installed on the computing device, in the way described above for the server system. In one example, the user of the first computing device is given an option to generate the unique identifier via a user interface of the deception technology program or application. In another example, the unique identifier is generated automatically without user request or input.

In operation 208, the server system generates a unique URL associated with the unique identifier. In one example the unique URL comprises the unique identifier and a predefined URL name. For example, a unique identifier for Joe Smith is T3c89P2 and a predefined URL name is privatebank.com. Using this example, the server system would generate a unique URL in the format of [unique identifier].[predefined URL name], such as T3c89P2.privatebank.com. In another example the server system could generate a unique URL in the format of [predefined URL name]/[unique identifier], such as privatebank.com/T3c89P2. It is to be understood that the unique URL (or other string) can be in other formats in embodiments described herein.

In one example, the server system generates a plurality of URL names to choose from for generating a unique URL and may periodically change or update URL names so that they do not become known to frequent unauthorized users. In one example, when new or updated URL names become available, the server system can push them out as unique URLs to existing or new computing devices to add to or replace existing unique URLs.

In another example, the unique identifier is not visible in the URL, but instead the unique identifier is associated with the URL such that the server system can link the URL to the unique identifier to identify what user and computing device is associated with the URL. This can be done using a URL shortener or other means.

In an alternative embodiment, the unique URL can be generated on the computing device via the deception technology installed on the computing device, in the way described above for the server system. In one example, the user of the first computing device is given an option to generate the unique URL via a user interface of the deception technology program or application. In another example, the unique URL is generated automatically without user request or input.

In one embodiment, the server system can additionally or alternatively generate a username and/or password that is also linked to the user and computing device (e.g., through the unique identifier). For example, the server system can generate a username based on the user's actual name, email address or other identifier, or similar to the user's actual name, email address or other identifier, or a unique or random username. Likewise, the server system can generate a password that may be obvious or straight forward to determine (e.g., "admin") or based on the user's actual name, email address, or other identifier, or a unique or random password.

In an alternative embodiment, the username and/or password be generated on the computing device via the deception technology installed on the computing device, in the way described above for the server system. In one example, the user of the first computing device is given an option to generate the username and/or password via a user interface of the deception technology program or application. In another example, the username and/or password is generated automatically without user request or input.

In operation 210, the server system transmits the unique URL to the computing device. The server system can transmit the unique URL to the computing device in one or more format, such as a message, as part of a new contact to be imported into the contacts on the first computing device, as a shortcut to be added to a user interface of the first computing device, as an icon to be added to a user interface of the first computing device, as a meeting invite, as a document to be stored on the first computing device, or as a note to be added to a notes application on the first computing device. It is to be understood that these are just examples of formats and that other formats can be used in example embodiments. If a username and password is generated, the username and/or password can also be transmitted with or instead of the unique URL in one or more of the above formats.

In one example, the server system generates a message that comprises the unique URL and alternatively or additionally the generated username and/or password and transmits the message to the computing device. For example, a text message (e.g., SMS or MMS) or email message is generated by the server system that includes a message with the unique URL and/or the generated username and/or password (e.g., username j smith and password admin). For instance, the message could be "reset your password: T3c89P2.privatebank.com" or "your username is j smith, to reset your password please go to T3c89P2.privatebank.com," or "your temporary password for username j smith is admin, please go to T3c89P2.privatebank.com to create a new password." The message can be transmitted to the computing device from the server system.

In another example, the server system generates a new contact that comprises the unique URL and alternatively or additionally the generated username and/or generated password and transmits the new contact to the computing device to be added to contacts on the computing device (e.g., automatically or by the user adding to his or her contacts). In one example, the contact is added to the device's contact book or address book. In one example the contact in in the form of a .vcf or file or similar format that can be added to any contact or address book. In one example, the contact can be added via a user interface of the deception technology program or application installed on the first computing device.

In another example, the server system generates an icon and/or shortcut to be added to a user interface of the computing device that is linked to the unique URL. For example, the server system generates an icon that looks like an app icon or a shortcut icon that is installed on a user interface of the computing device that will link to the URL when it is selected. The icon could have a name associated with the URL (e.g., Private Bank or PasswordKeeper).

In another example, the server system generates a meeting invite or calendar entry that comprises the unique URL and alternatively or additionally the generated username and/or password and transmits the meeting invite or calendar entry to the computing device. This meeting invite or calendar entry can be added to a calendar on the computing device (e.g., automatically or by the user adding it to the calendar). In one example the meeting invite is an .ics file or similar format that can be added to any calendar system. In one example, the meeting invite can be added via a user interface of the deception technology program or application installed on the first computing device.

In another example, the server system generates a document that comprises the unique URL and alternatively or additionally the generated username and/or password and transmits the document to the computing device to be stored on the computing device.

In another example, the server system generates a note to be added to a notes application on the computing device that comprises the unique URL and alternatively or additionally the generated username and/or password and transmits the note to the computing device. For example, the server system may determine a type of computing device or operating system (e.g., Android, iOS) or a notes application that is installed on the computing device, and generate a note compatible to be added to a notes application on the computing device.

In example embodiments, the server system can generate more than one format for transmitting the unique URL and/or the generated username and/or generated password (e.g., a new contact, a text message, and an icon) such that there is more than one opportunity to catch an unauthorized access to the computing device. For example, any combination of the above-mentioned formats could be generated and transmitted to the computing device.

In an alternative embodiment, the format can be generated on the computing device via the deception technology installed on the computing device, in the way described above for the server system. In one example, the user of the first computing device is given a menu of options for the format to select for generation, via a user interface of the deception technology program or application. In another example, one or more of the formats is generated automatically without user request or input.

The server system further can alert the user to which formats were transmitted and stored on the computing device so the user knows not to access those formats. For example, after the deception technology is installed on the computing device and the unique identifier and unique URL are generated, the server system can display a selection of options for formats for transmitting the unique URL or can automatically install one or more formats (determined randomly or by predetermined selection) and notify the user (e.g., via a message on a user interface associated with the deception technology) what format or formats have been transmitted and stored on the computing device.

In an alternative embodiment, the computing device can alert the user to which formats are stored on the computing device via the deception technology installed on the computing device, in the way described above for the server system. In one example, the user interface of the deception program or application may display the list of formats that were generated so that the user knows which were generated.

In one example, the server system determines that the computing device is a desktop computer and additionally opens a computer port on the computing device to monitor or "listen" for incoming connections. For example, the server system (either directly or via the installed deception technology on the computing device) can open up a TCP port and make it look like there is a service running behind it. The server system can then listen for any incoming connections or activity. For example, the server system can detect when another computing device or system connects to the TCP port, starts scanning the TCP, starts accessing data via the TCP port, and so forth.

Figure 3:
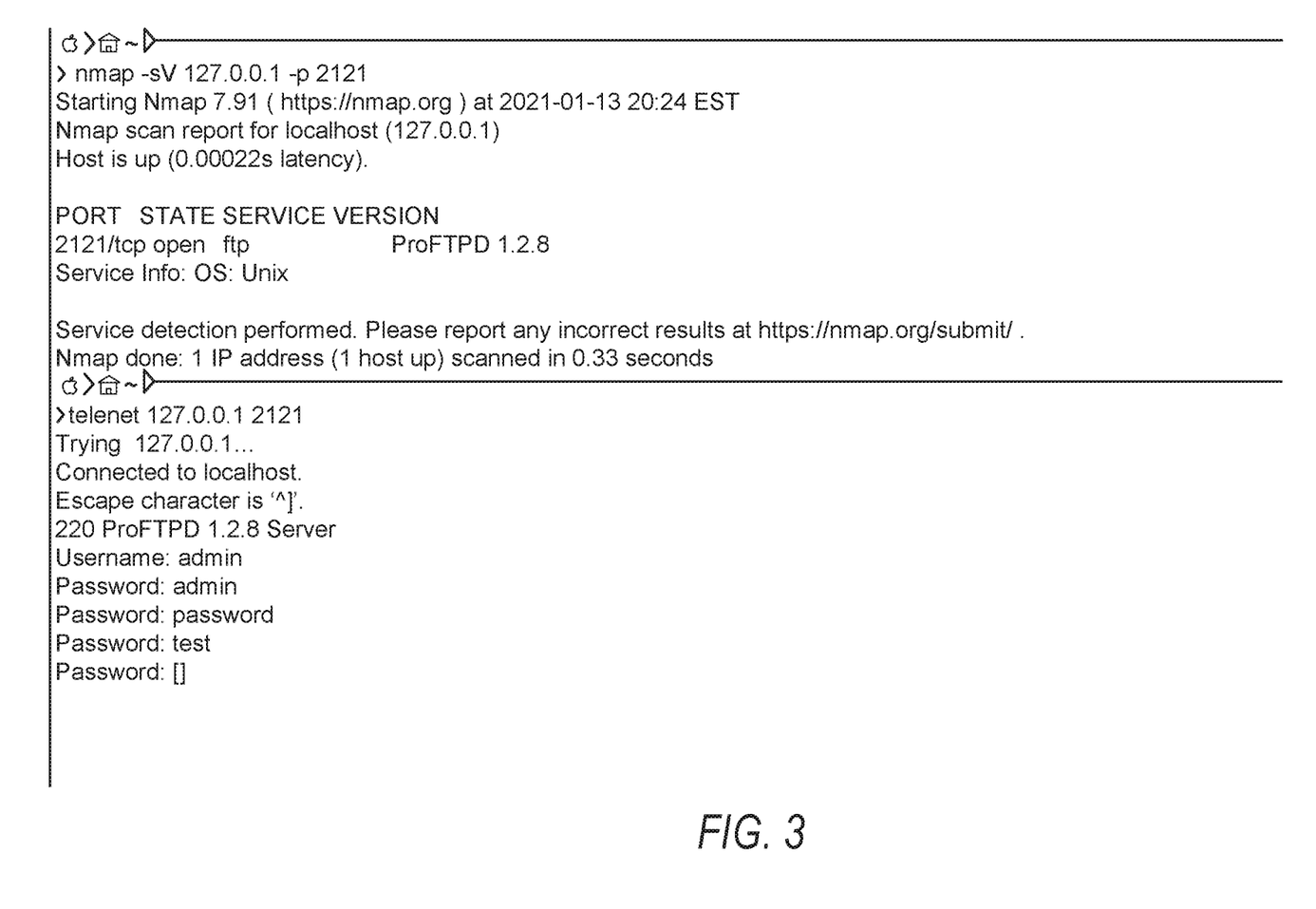
FIGS. 3 and 4 illustrate an example of network scanning and logging, according to some example embodiments.
Figure 4:
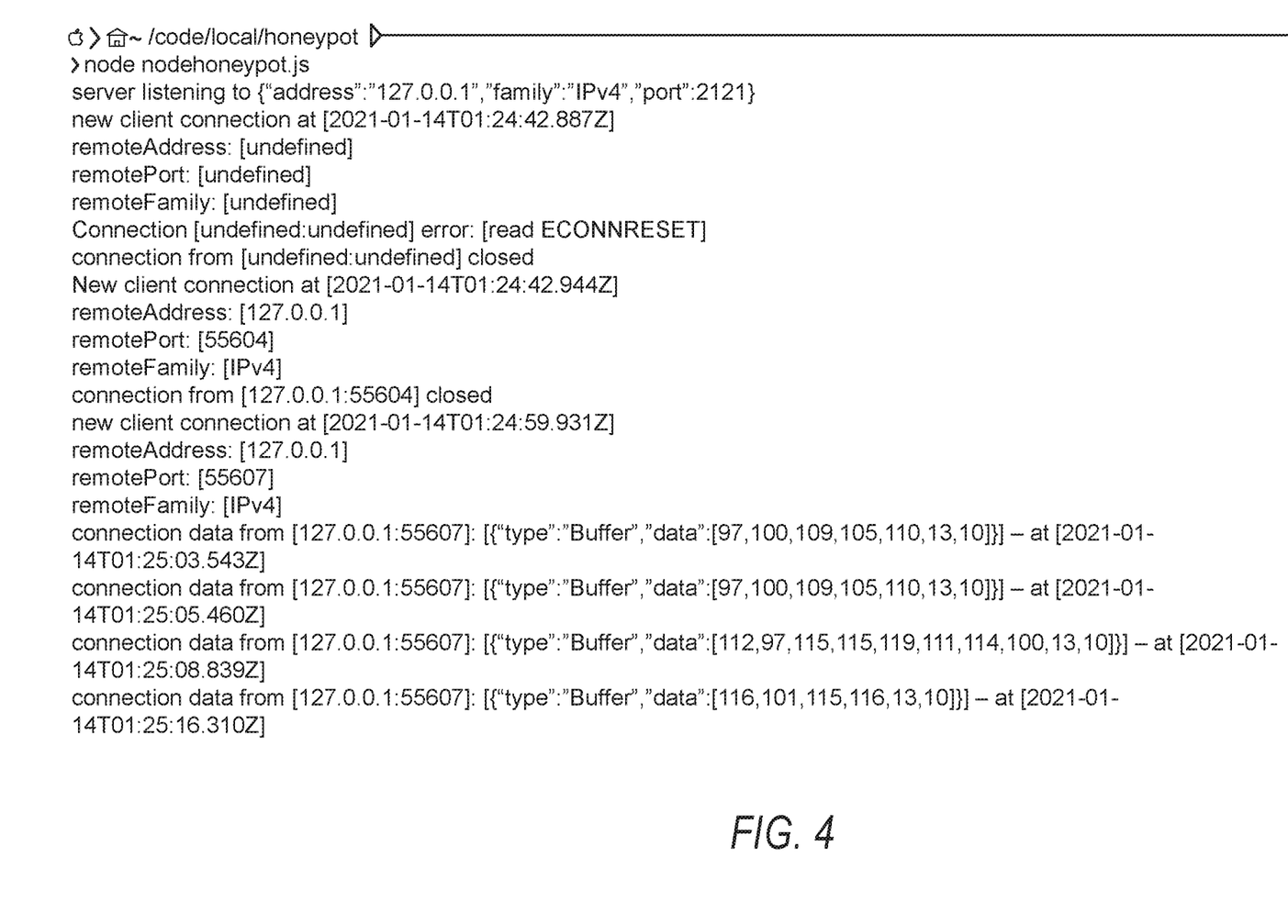

The server system can also log everything that is performed by the unauthorized user via the TCP port. For example, FIG. 3 illustrates activity performed by the unauthorized user and FIG. 4 illustrates data captured by the computing system based in the activity in FIG. 3. The server system can generate a notification of the access, as explained below.

Returning to FIG. 2, in operation 212, the server system detects that the unique URL has been accessed by a second computing device. The server system can also detect that the generated username and password was entered into a web site associated with the unique URL.

Figure 5:
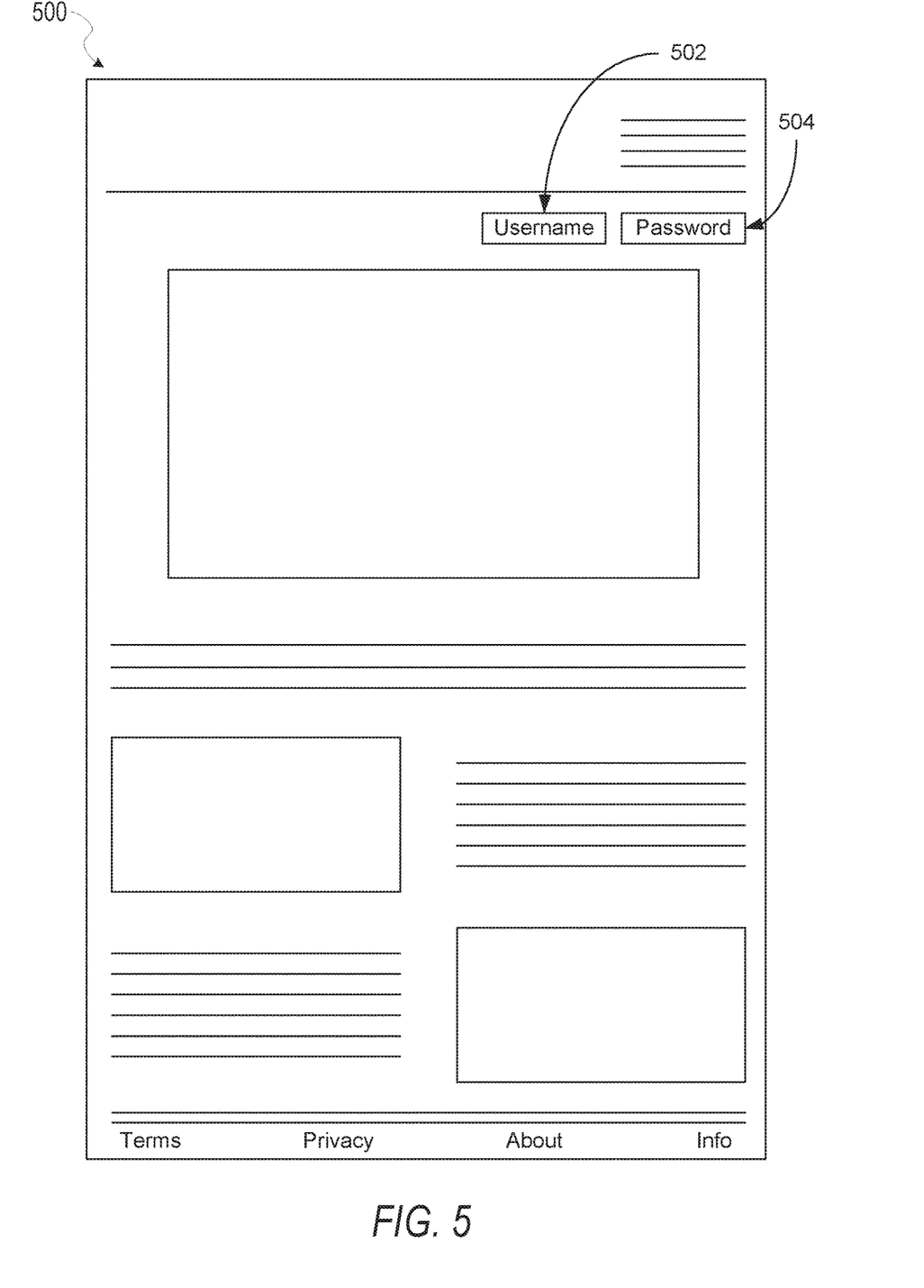
FIG. 5 illustrates an example landing page for a unique uniform resource locator (URL), according to some example embodiment.

For example, an unauthorized user (e.g., using the second computing device) may gain access to the computing device (e.g., hack into the computing device) and access one of the formats listed above that was transmitted to the computing device. For example, the unauthorized user can access a message, contact, icon, shortcut, meeting invite, document, note, and so forth, that has the unique URL and/or the generated username and/or generated password and copy the unique URL and/or the generated username and/or generated password to the second device. When the unauthorized user accesses the URL and/or enters the generated username and/or password, the sever system detects this access and/or entry of username and password since the unique URL is not a URL that should be access by a legitimate user. FIG. 5 illustrates an example webpage 500 that may appear to an unauthorized user once the unauthorized user accesses the URL. The webpage looks exactly like a website for a legitimate financial institution or other entity and may also allow the unauthorized user to enter a username 502 and password 504.

Returning to FIG. 2, in operation 214, the server system captures data related to the access of the unique URL and the second computing device (that has access the unique URL). For example, once the server system detects the access of the unique URL, the server system can capture (e.g., record/log) data identifying the time and date the URL is accessed, and at least one of the following information associated with the second computing device accessing the URL: an IP address, a MAC address, system information associated with the second computing device, events associated with access of the URL, GPS location of the computing device accessing the URL, motion information, network information or other data accessible to the server system.

In operation 216, the server system generates a notification of the access. The notification can be generated and sent to a user associated with the computing device that is compromised in real time or near real time upon detecting unauthorized access.

For example, the server system generates an alert to the user about the unauthorized access. The server system can determine the user and device based on the unique identifier associated with the unique URL and determine one or more methods for sending the alert to the user (e.g., via email, text message, phone call). In one example the alert can provide information on what steps or actions the user can take next to secure the user's computing device. In yet another example, the server system can immediately lock the user's computing device, block an IP address scanning the computing device, delete or wipe sensitive information off of the computing device, or other actions for protecting the computing device and the user's sensitive information.

The server system can send the generated notification to a computing device of a user (or via a phone call) associated with the unique URL and unique identifier. In one example the alert is displayed via a user interface of the deception technology program or application installed on the first computing device. Moreover, the server system can send the notification to a central monitoring center or security operations center.

Figure 6:
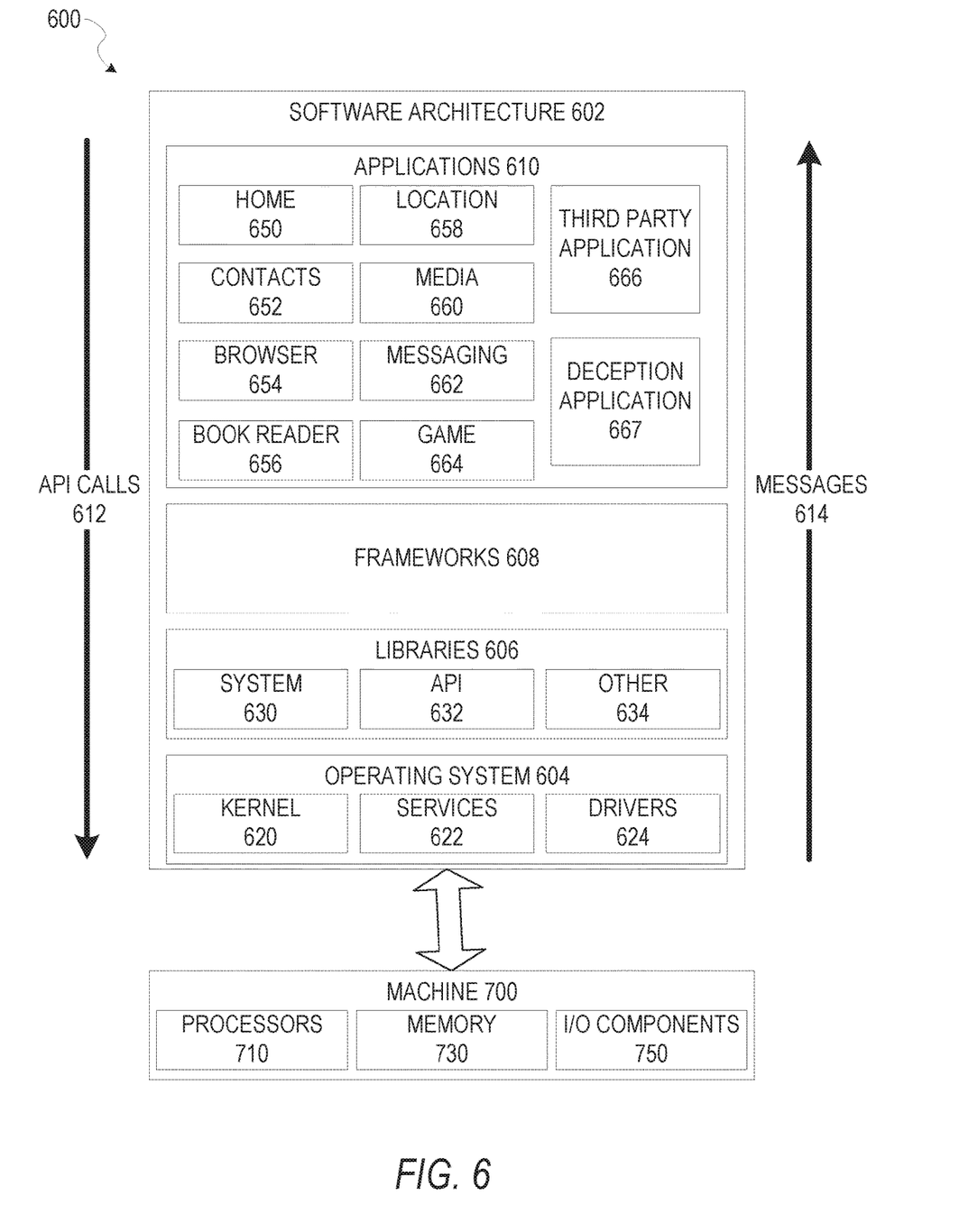
FIG. 6 is a block diagram illustrating an example of a software architecture that may be installed on a machine, according to some example embodiments.

FIG. 6 is a block diagram 600 illustrating software architecture 602, which can be installed on any one or more of the devices described above. For example, in various embodiments, client devices 110, analyst device(s) 130, and server systems 102, 120, and 160 may be implemented using some or all of the elements of software architecture 602. FIG. 6 is merely a non-limiting example of a software architecture, and it will be appreciated that many other architectures can be implemented to facilitate the functionality described herein. In various embodiments, the software architecture 602 is implemented by hardware such as machine 700 of FIG. 7 that includes processors 710, memory 730, and I/O components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments.

For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third party applications 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 666 can invoke the API calls 612 provided by the operating system 604 to facilitate functionality described herein.

Some embodiments may particularly include a deception application 667. In certain embodiments, this may be a stand-alone application that operates to manage communications with a server system such as third party server(s) 160 or server system 102. In other embodiments, this functionality may be integrated with another application such as an email or messaging application or another such application. Deception application 667 may facilitate detecting unauthorized access to a computing device, communications related to the unauthorized access, and provide the capability for a user to input data related to electronic communications via a touch interface, keyboard, or other mechanism of machine 700, communication with a server system via I/O components 750, and receipt and storage of analysis data in memory 730. Functionality related to request messages to analyze potentially fraudulent electronic communications can be managed by deception application 667 using different frameworks 608, libraries 606 elements, or operating system 604 elements operating on a machine 700.

Figure 7:
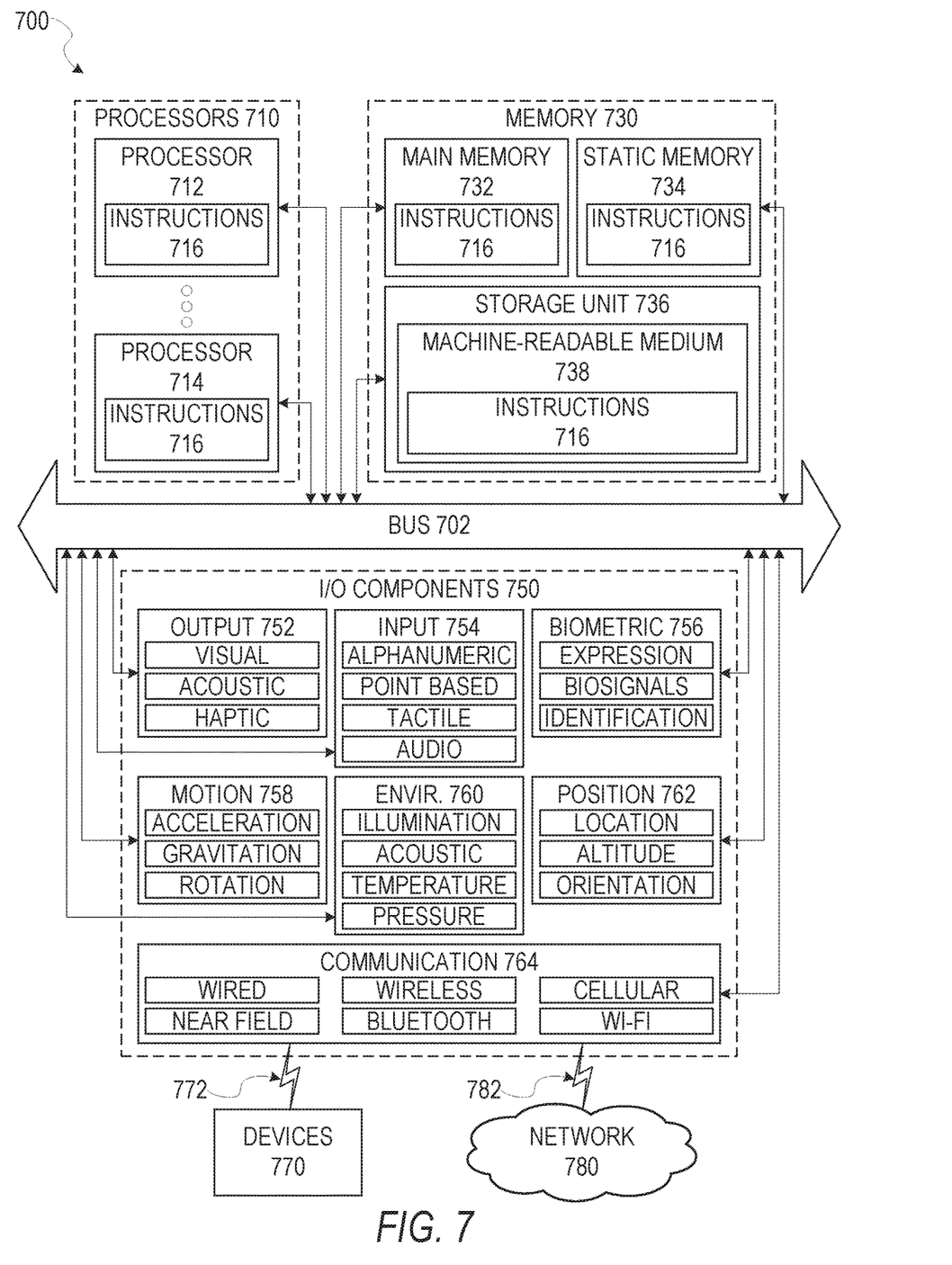
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine 102, 120, 160, etc., or a client device 110 or analyst device 130 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 710 with a single core, a single processor 710 with multiple cores (e.g., a multi-core processor 710), multiple processors 712, 714 with a single core, multiple processors 710, 712 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium 738 is incapable of movement; the medium 738 should be considered as being transportable from one physical location to another. Additionally, since the machine-readable medium 738 is tangible, the medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   generating, by a server system, a first unique identifier that is unique to a user of a mobile computing device;
   generating, by the server system, a second unique identifier that is unique to the mobile computing device;
   combining, by the server system, the first unique identifier and the second unique identifier into one unique identifier to identify the user and the mobile computing device;
   generating, by the server system, a unique Uniform Resource Locator (URL) comprising a combination of a predefined URL and the one unique identifier comprising the first unique identifier that is unique to the user of the mobile computing device and the second unique identifier that is unique to the mobile computing device;

transmitting, by the server system, the unique URL to the mobile computing device in at least one of the following formats: as a shortcut to be added to a user interface of the mobile computing device, as an icon to be added to a user interface of the mobile computing device, as a meeting invite, or as a note to be added to a notes application on the mobile computing device;

detecting, by the server system, that the unique URL has been accessed by a second computing device that is not the mobile computing device of the user; and generating, by the server system, a notification of access of the unique URL by the second computing device.

2. The method of claim 1, further comprising:
generating a username and password;
transmitting the username and password to the mobile computing device with the unique URL.

3. The method of claim 2, further comprising:
detecting that the username and password was entered in a website associated with the unique URL.

4. The method of claim 1, wherein the unique URL is transmitted in the form of a new contact, and further comprising:
generating a username and password;
generating a new contact comprising the username and password and the unique URL; and
transmitting the new contact to the first computing device, wherein the new contact is added to contacts on the mobile computing device.

5. The method of claim 1, wherein the unique URL is transmitted in the form of a text message, and further comprising:
generating the text message comprising the unique URL.

6. The method of claim 1, wherein the unique URL is transmitted as an icon to be added to the user interface of the mobile computing device, the method further comprising:
generating an icon linked to the unique URL;
causing the generated icon to be added to the user interface of the mobile computing device.

7. The method of claim 1, further comprising:
determining the user and device associated with the unique URL based on the unique identifier; and
sending the generated notification to a computing device of the user associated with the unique URL and unique identifier.

8. The method of claim 1, wherein the unique URL is further transmitted in at least one of the following formats: as part of a new contact to be imported into the contacts on the mobile computing device or a message.

9. The method of claim 1, wherein the unique identifier is generated by the mobile computing device.

10. The method of claim 1, further comprising:
determining that a new predefined URL is available; and
causing the unique URL to be updated by replacing the predefined URL with the new predefined URL.

11. The method of claim 1, further comprising:
pushing out a new predefined URL to the mobile computing device to replace the predefined URL in the unique URL with the new predefined URL.

12. The method of claim 1, further comprising:
capturing data identifying a time and date the unique URL is accessed, and at least one of the following information associated with the second computing device accessing the URL: an IP address, a MAC address, system information associated with the second computing device, events associated with access of the URL, GPS location of the computing device accessing the URL, motion information, or network information.

13. A server system comprising:
a hardware processor; and
a computer-readable medium coupled with the processor, the computer-readable medium comprising instructions stored thereon that are executable by the processor to cause a computing device to perform operations comprising:
generating a first unique identifier that is unique to a user of a mobile computing device;
generating a second unique identifier that is unique to the mobile computing device;
combining the first unique identifier and the second unique identifier into one unique identifier to identify the user and the mobile computing device;
generating a unique Uniform Resource Locator (URL) comprising a combination of a predefined URL and the one unique identifier comprising the first unique identifier that is unique to the user of the mobile computing device and the second unique identifier that is unique to the mobile computing device;
transmitting the unique URL to the mobile computing device in at least one of the following formats: as a shortcut to be added to a user interface of the mobile computing device, as an icon to be added to a user interface of the mobile computing device, as a meeting invite, or as a note to be added to a notes application on the mobile computing device;
detecting that the unique URL has been accessed by a second computing device that is not the mobile computing device of the user; and
generating a notification of access of the unique URL by the second computing device.

14. The server system of claim 13, the operations further comprising:
generating a username and password;
transmitting the username and password to the mobile computing device with the unique URL; and
detecting that the username and password was entered in a website associated with the unique URL.

15. The server system of claim 13, the operations further comprising:
determining the user and device associated with the unique URL based on the unique identifier; and
sending the generated notification to a computing device of the user associated with the unique URL and unique identifier.

16. The server system of claim 13, wherein the unique URL is further transmitted in at least one of the following formats: as part of a new contact to be imported into the contacts on the mobile computing device or a message.

17. The server system of claim 13, wherein the unique identifier is generated by the mobile computing device.

18. The server system of claim 13, the operations further comprising:
determining that a new predefined URL is available; and
causing the unique URL to be updated by replacing the predefined URL with the new predefined URL.

19. The server system of claim 13, the operations further comprising:
capturing data identifying a time and date the unique URL is accessed, and at least one of the following information associated with the second computing device accessing the URL: an IP address, a MAC address, system information associated with the second computing device, events associated with access of the URL, GPS location of the computing device accessing the URL, motion information, or network information.

20. A non-transitory computer-readable medium comprising instructions stored thereon that are executable by at least one processor to cause a computing device to perform operations comprising:
  generating a first unique identifier that is unique to a user of a mobile computing device;
  generating a second unique identifier that is unique to the mobile computing device;
  combining the first unique identifier and the second unique identifier into one unique identifier to identify the user and the mobile computing device;
  generating a unique Uniform Resource Locator (URL) comprising a combination of a predefined URL and the one unique identifier comprising the first unique identifier that is unique to the user of the mobile computing device and the second unique identifier that is unique to the mobile computing device;
  transmitting the unique URL to the mobile computing device in at least one of the following formats: as a shortcut to be added to a user interface of the mobile computing device, as an icon to be added to a user interface of the mobile computing device, as a meeting invite, or as a note to be added to a notes application on the mobile computing device;
  detecting that the unique URL has been accessed by a second computing device that is not the mobile computing device of the user; and
  generating a notification of access of the unique URL by the second computing device.

* * * * *